United States Patent
Shanware

(10) Patent No.: US 11,539,577 B2
(45) Date of Patent: *Dec. 27, 2022

(54) SYSTEM AND METHODS FOR ALERTING A USER CONSUMING MEDIA TO THE PROGRESS OF OTHERS CONSUMING MEDIA

(71) Applicant: Rovi Guides, Inc., San Jose, CA (US)

(72) Inventor: Ajit Shanware, Cupertino, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/396,373

(22) Filed: Aug. 6, 2021

(65) Prior Publication Data

US 2021/0377104 A1   Dec. 2, 2021

Related U.S. Application Data

(63) Continuation of application No. 16/045,499, filed on Jul. 25, 2018, now Pat. No. 11,146,446, which is a (Continued)

(51) Int. Cl.
*G06F 16/245* (2019.01)
*G06Q 50/00* (2012.01)
(Continued)

(52) U.S. Cl.
CPC ...... *H04L 41/0681* (2013.01); *G06F 3/04842* (2013.01); *G06F 9/542* (2013.01);
(Continued)

(58) Field of Classification Search
CPC ... H04L 41/0681; H04L 43/045; H04L 43/16; H04L 67/104; G06F 16/245;
(Continued)

(56) References Cited

U.S. PATENT DOCUMENTS

| 8,655,953 B2 | 2/2014 | Kandekar et al. |
| 9,692,841 B1 * | 6/2017 | Chandler ............... G06Q 50/01 |

(Continued)

FOREIGN PATENT DOCUMENTS

| CN | 102098537 A | 6/2011 |
| CN | 103369369 A | 10/2013 |

(Continued)

OTHER PUBLICATIONS

PCT International Search Report for International Application No. PCT/US2016/067711, dated Feb. 17, 2017(10 pages).

*Primary Examiner* — Daniel Samwel
(74) *Attorney, Agent, or Firm* — Haley Guiliano LLP

(57) ABSTRACT

Systems and methods are provided herein for enabling a first user to set up an alert that will notify the first user when the first user has caught up to a second user's progress in consuming media. These systems and methods are used to ensure that the first user is informed, while they are consuming media, that they have caught up to the progress of a second user. By providing an alert while the first user is viewing media, the first user does not have to remember the progress of the second user while viewing the media, alleviating the first user from worrying they will pass the progress made by the second user without realizing they have done so.

20 Claims, 9 Drawing Sheets

Related U.S. Application Data continuation of application No. 14/978,707, filed on Dec. 22, 2015, now Pat. No. 10,063,408.

(51) Int. Cl.

| | |
|---|---|
| *H04N 21/442* | (2011.01) |
| *G06F 3/04842* | (2022.01) |
| *H04L 41/0681* | (2022.01) |
| *G06Q 10/10* | (2012.01) |
| *G06F 9/54* | (2006.01) |
| *H04L 43/045* | (2022.01) |
| *H04L 43/16* | (2022.01) |
| *H04L 67/104* | (2022.01) |

(52) U.S. Cl.
CPC ......... *G06F 16/245* (2019.01); *G06Q 10/109* (2013.01); *G06Q 50/01* (2013.01); *H04L 43/045* (2013.01); *H04L 43/16* (2013.01); *H04L 67/104* (2013.01); *H04N 21/44204* (2013.01)

(58) Field of Classification Search
CPC ... G06F 3/04842; G06F 9/542; G06Q 10/109; G06Q 50/01; H04N 21/44204
See application file for complete search history.

(56) References Cited

U.S. PATENT DOCUMENTS

| | | | |
|---|---|---|---|
| 9,760,254 B1 * | 9/2017 | Donnelley | ............ G06F 40/131 |
| 11,146,446 B2 | 10/2021 | Shanware | |
| 2007/0157237 A1 | 7/2007 | Cordray et al. | |
| 2009/0154893 A1 | 6/2009 | Vasudevan et al. | |
| 2009/0183220 A1 | 7/2009 | Amento et al. | |
| 2009/0249223 A1 | 10/2009 | Barsook et al. | |
| 2010/0027966 A1 | 2/2010 | Harrang et al. | |
| 2011/0069940 A1 | 3/2011 | Shimy et al. | |
| 2013/0198298 A1 | 8/2013 | Li et al. | |
| 2013/0254308 A1 | 9/2013 | Rose et al. | |
| 2014/0101244 A1 | 4/2014 | Klein et al. | |
| 2014/0122564 A1 | 5/2014 | Arora et al. | |
| 2015/0089372 A1 * | 3/2015 | Mandalia | ......... H04N 21/47217 715/720 |
| 2015/0249543 A1 | 9/2015 | Tang | |
| 2016/0014461 A1 | 1/2016 | Leech et al. | |
| 2016/0019934 A1 * | 1/2016 | Mese | .................... G11B 27/30 386/241 |
| 2016/0117067 A1 * | 4/2016 | Ghosh | .................. G06F 40/169 715/753 |
| 2017/0154317 A1 | 6/2017 | Bruce et al. | |
| 2017/0171626 A1 | 6/2017 | Eatedali et al. | |

FOREIGN PATENT DOCUMENTS

| | | | |
|---|---|---|---|
| JP | 2004229035 A | 8/2004 | |
| JP | 2009522853 A | 6/2009 | |
| JP | 2012248960 A | 12/2012 | |
| JP | 2013038516 A | 2/2013 | |
| WO | 2014074072 A1 | 5/2014 | |
| WO | 2014106213 A1 | 7/2014 | |

* cited by examiner

1100

1102
Begin a Process for Generating for Display an Alert Indicating the First User has Caught Up to the Second User

1104
Receive an Indication that the First User has Caught Up to the Second User

1106
Render Graphics for the Alert that the First User has Caught Up to the Second User

1108
Output on a Display the Alert that the First User has Caught Up to the Second User End

FIG. 11

SYSTEM AND METHODS FOR ALERTING A USER CONSUMING MEDIA TO THE PROGRESS OF OTHERS CONSUMING MEDIA

CROSS REFERENCE TO RELATED APPLICATION

This application is a continuation of U.S. patent application Ser. No. 16/045,499, filed Jul. 25, 2018, which is a continuation of U.S. patent application Ser. No. 14/978,707, filed Dec. 22, 2015, now U.S. Pat. No. 10,063,408. The disclosures of each referenced application are hereby incorporated by reference herein in their entireties.

BACKGROUND

A consumer may wish to consume media content in the company of friends, family, or other specified users, but may be unable to. In this situation, the consumer may wish to determine the progress their friends, family, or others made consuming the media content, so that the consumer can catch up to their progress consuming the media content. For instance, a wife may desire to catch up to her husband's progress in a particular show during the day in order to watch together from the same episode later in the evening. Additionally, the consumer may have trouble learning or remembering the progress point of friends, family, or others while the consumer is consuming the media content and may accidentally or unknowingly go past the users' progress points.

SUMMARY

Systems and methods are provided herein for enabling a first user to set up an alert that will notify the first user when the first user has caught up to a second user's progress in consuming media. These systems and methods are used to ensure that the first user is informed, while he or she is consuming media, that he or she has caught up to the progress of a second user. By providing an alert while the first user is viewing media, the first user does not have to remember the progress of the second user while viewing the media, thus alleviating the first user from worrying he or she will pass the progress made by the second user without realizing he or she has done so.

In some aspects of the disclosure, control circuitry may receive a first selection, made by a first user of a media consumption application, of an identifier of a second user, where the media consumption application provides access to a variety of media. The media consumption application could be any user interface generated by control circuitry that facilitates access to media by the user. The identifier is associated with the second user and allows the control circuitry to determine the second user that the first user desires to select. For instance, a user may select an icon with an image of a sibling whose progress consuming media the user is interested in. The control circuitry in this case will detect a selection of an identifier corresponding to the sibling that is associated with the sibling.

In some embodiments, control circuitry may receive a second selection, made by the first user, of an identifier of media, where the identifier corresponds to first media accessible through the media consumption application. The identifier is associated with the selected first media and allows the control circuitry to determine the first media that the first user desires to select. For example, a user may select a specific television series, "Seinfeld," that he or she is interested in consuming. The control circuitry in this case will detect a user selection of an identifier corresponding to the series "Seinfeld" that is unique to the series.

In some embodiments, in response to receiving both the first selection and the second selection, control circuitry may monitor for access of the first media by the first user. Continuing with the selections made by the user in the previous examples, the control circuitry may store the unique media identifier associated with the series "Seinfeld" in a first data structure. The first data structure may contain profile information relating to the first user, such as media the first user has viewed, associated accounts, and account settings. The control circuitry may receive an indication that the first user is using the media consumption application to consume media with a second media identifier. In response to receiving this indication, the control circuitry may query the first data structure to determine if the media with the second media identifier currently consumed is the same as the first media identifier, corresponding to "Seinfeld," stored in the first data structure.

In some embodiments, control circuitry may detect, during the monitoring, that the first user is accessing the first media. For example, control circuitry may detect, based on the monitoring by the control circuitry, that the first user has accessed and is consuming an episode of "Seinfeld."

In some embodiments, control circuitry may compare, while the first user is accessing the first media, a first consumption progress of the first user with respect to the first media with a second consumption progress of the second user with respect to the first media. Continuing with the "Seinfeld" example, the control circuitry may query a first data structure associated with the first user for the first consumption progress with respect to the series "Seinfeld," and may determine that the first consumption progress of the first user corresponds to 10 minutes into episode 5 of season 4. The control circuitry may then query a second data structure associated with the sibling for the second consumption progress with respect to the series "Seinfeld" and may determine that the second consumption progress of the sibling corresponds to 15 minutes into episode 5 of season 4. The second data structure may contain profile information relating to the second user, such as media the second user has viewed, associated accounts, and account settings. The control circuitry may then compare the first consumption progress and the second consumption progress.

In some embodiments, control circuitry may determine, based on the comparing, that the first user has caught up to the consumption progress of the second user. Continuing from the previous example, the control circuitry may compare the first consumption progress of the first user with the second consumption progress of the sibling for the show "Seinfeld." For example, the control circuitry may determine by subtraction of the consumption progress of the first user from the consumption progress of the second user that the consumption progress in the series "Seinfeld" for the first user is 5 minutes away from the consumption progress in the series "Seinfeld" of the sibling. The control circuitry may then compare the result of the comparison with a threshold criterion, where the threshold criterion defines a range of the relative consumption progress of the first user with respect to the consumption progress of the second user that qualifies the first user's consumption progress as being caught up to the second user's consumption progress. If, for instance, the threshold criterion was that the first consumption progress of the first user and the second consumption progress of the second user are within 10 minutes of each other, then the control circuitry may determine the threshold condition is met, because the control circuitry determined the first user is 5 minutes away from the second user's progress and 5 minutes is less than the 10 minute threshold criterion. In response to a determination that the threshold condition is met, the control circuitry may determine that the first user has caught up to the second user.

In some embodiments, in response to the control circuitry determining that the first user has caught up to the consumption progress of the second user, control circuitry may generate for display an alert indicating the first user has caught up to the second user. For example, in response to the control circuitry determining that the first user has caught up to the consumption progress of their sibling in the series "Seinfeld," the control circuitry may pause, without further input from the first user, playback of the series "Seinfeld" currently being accessed by the first user, where control circuitry may generate for display the alert while the playback of "Seinfeld" is paused.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 11 is a flowchart of illustrative steps involved in generating for display an alert indicating the first user has caught up to the second user, in accordance with some embodiments of the disclosure.

DETAILED DESCRIPTION

Figure 1:
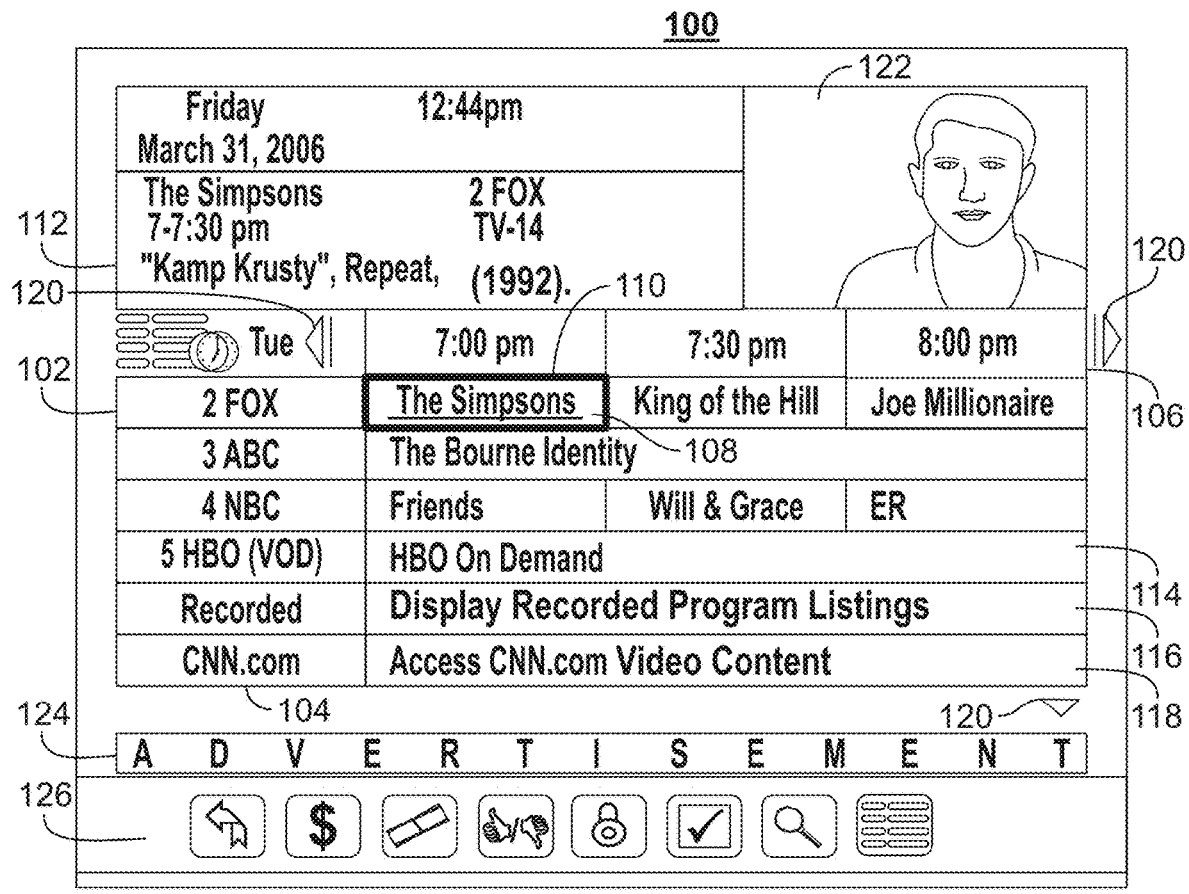
FIG. 1 shows an illustrative embodiment of a display screen that may be used to provide media guidance application listings and other media guidance information, in accordance with some embodiments of the disclosure.

Systems and methods are provided herein for enabling a first user to set up an alert that will notify the first user when the first user has caught up to a second user's progress in consuming media. These systems and methods are used to ensure that the first user is informed, while he or she is consuming media, that he or she has caught up to the progress of a second user. By providing an alert while the first user is viewing media, the first user does not have to remember the progress of the second user while viewing the media, thus alleviating the first user from worrying he or she will pass the progress made by the second user without realizing he or she has done so.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
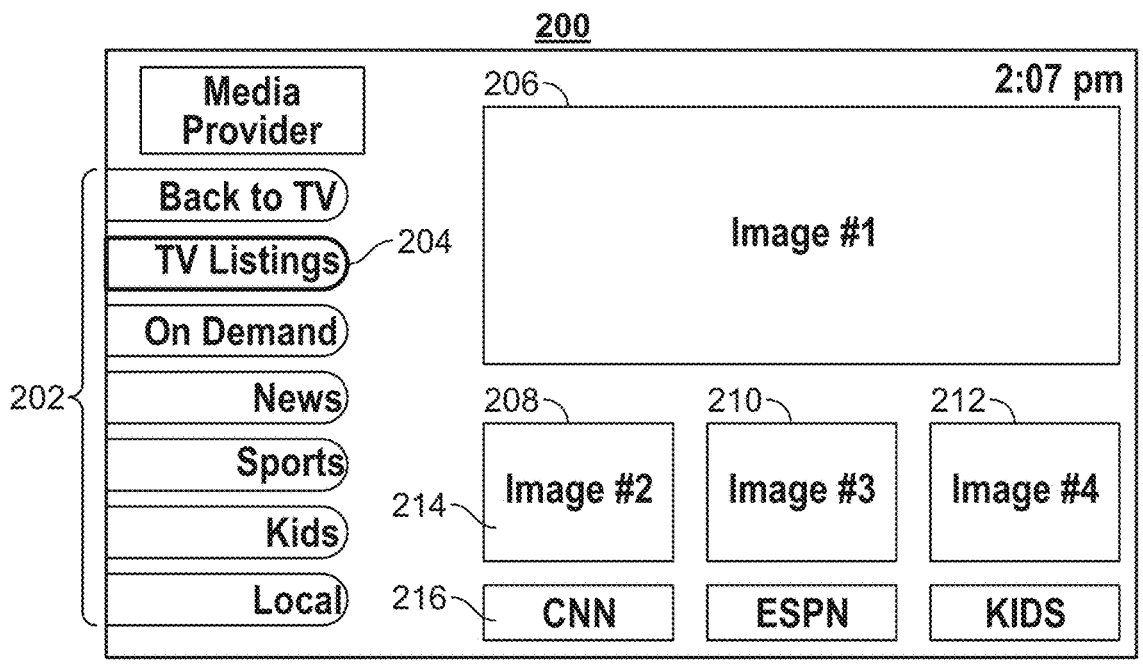
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
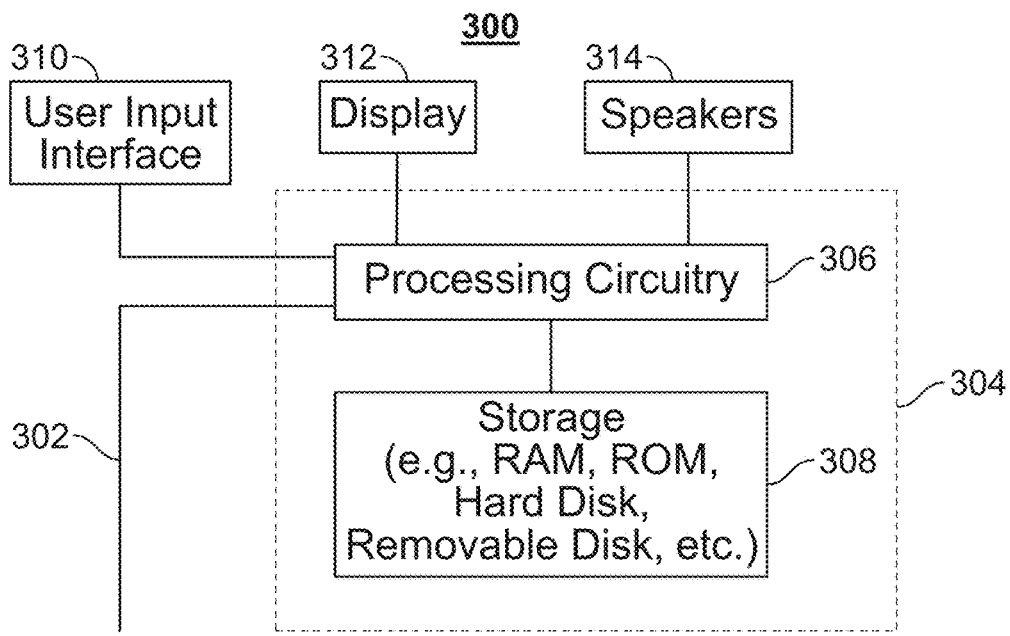
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from user input interface 310. For example, movement of a cursor on a display up/down may be indicated by the processed instructions when user input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via user input interface 310 and transmit those inputs to the remote server for processing and generating the corresponding displays. For example, equipment device 300 may transmit a communication to the remote server indicating that an up/down button was selected via user input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
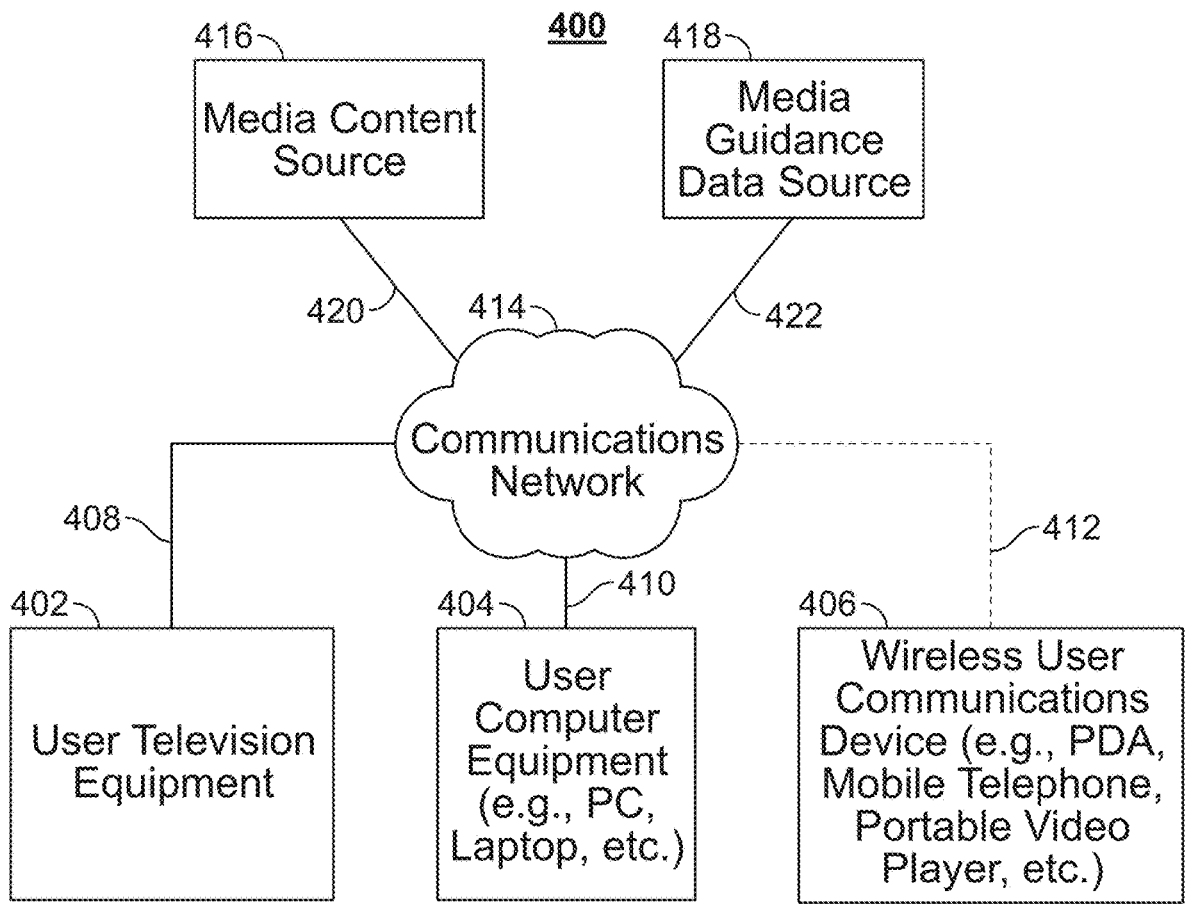
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
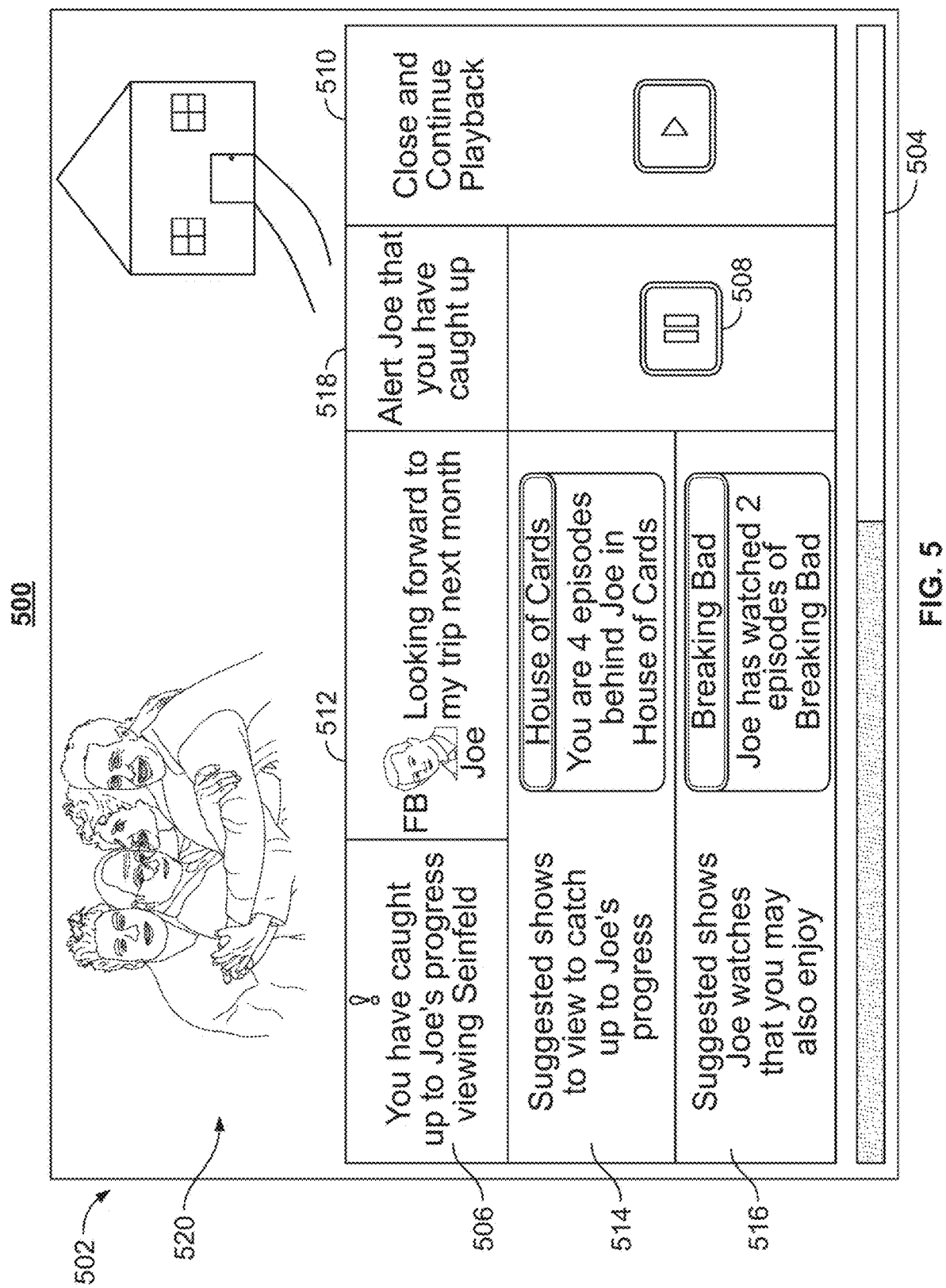
FIG. 5 depicts an illustrative user equipment displaying a user interface of a media consumption application, in accordance with some embodiments of the disclosure.

FIG. 5 depicts an illustrative user equipment displaying a user interface of a media consumption application, in accordance with some embodiments of the disclosure. FIG. 5 depicts user equipment 500, which may be any of user television equipment 402, user computer equipment 404, and wireless user communications device 406. Control circuitry 304 is installed on the user equipment 500 and executes media consumption application 502, which may have any of the described capabilities of media guidance application 100. Control circuitry 304 may generate for display a graphical user interface for media consumption application 502 on display 312. Control circuitry 304 may generate for display time bar 504, which may comprise any indication of progress of media control, such as a start time, an end time, scene indicators and other demarcations, and the like.

In some embodiments, control circuitry (e.g., control circuitry 304) may receive a first selection, made by a first user of media consumption application 502 via user input interface 310, of an identifier of a second user, where media consumption application 502 provides access to a variety of media. The identifier of a second user may consist of a string of characters that could be matched to metadata in a stored user profile in a data structure corresponding to the second user. The string of characters may refer to a name, birthdate, user handle (profile name), or any other identifying characteristic of the second user stored in the user profile for the second user. Control circuitry 304 may access, via communications network 414, media guidance data source 418, which contains a plurality of data structures associated with user profiles containing associated metadata, such as the user's name, handle, birthdate, etc.

For example, control circuitry 304 may access a three-dimensional matrix stored at media guidance data source 418, where each user profile (i.e., a data structure corresponding to a user) is a two-dimensional slice of the stored matrix. Control circuitry 304 may determine the second user that the first user desires to select by comparing the string of characters to stored metadata in the data structure associated with the second user.

For instance, control circuitry 304 may receive a selection by the first user from user input interface 310 of an indication of a second user, such as his or her sibling, whose progress consuming media the first user is interested in. Control circuitry 304 may receive the selection of the identifier of the second user directly from the first user via user input interface 310, or may receive the selection of the identifier of the second user from the first user selecting an option with an associated identifier. For instance, control circuitry 304 may receive a selection from the first user via user input interface 310 of a name of a second user that he or she is interested in, such as his or her sibling's name, "Joe," or a user's handle "joe.12345." As another example, control circuitry 304 may receive a selection of an identifier of the second user from the first user, via user input interface 310, selecting an option that is associated with the second user, such as an icon with an image of Joe. Control circuitry 304 may associate an identifier of a second user with the icon and receive the selection of the identifier of the second user upon control circuitry 304 receiving a selection of the icon.

Control circuitry 304 may then determine the second user that the first user desired to select based on comparing the received first selection with an identifier corresponding to the second user, the sibling, stored in a data structure associated with the second user. The data structure may be located at a media guidance data source 418 and accessed by control circuitry 304 through a communications network 414, as described above.

In some embodiments, control circuitry 304 may receive a second selection, made by the first user, of an identifier of media, where the identifier corresponds to first media accessible through media consumption application 502. The identifier of media may comprise a string of characters that could be matched to metadata in a stored user profile in the second data structure corresponding to the second user. The second data structure may contain metadata associated with media the user has consumed, progress the user has made consuming media, and information about the user. The string of characters could refer to a title, actor, studio name, or any other identifying characteristic of media.

Control circuitry 304 may access the second data structure located on media guidance data source 418, which contains a plurality of user profiles with associated metadata, via communications network 414, as described above. For instance, control circuitry 304 may receive a selection from a user of a first media, such as the program series "Seinfeld," the first user is interested in. Control circuitry 304 in this case may receive a selection of an identifier corresponding to the first media, "Seinfeld," such as the title of the show or an actor associated with the show, such as "Jerry Seinfeld." Control circuitry 304 may receive the selection of the identifier of media in the same way as was described for receiving the selection of a second user above. Control circuitry 304 may then determine the first media that the first user desired to select based on comparing the received second selection with an identifier corresponding to the first media, "Seinfeld," stored in the second data structure.

In some embodiments, in response to receiving both the first selection and the second selection, control circuitry 304 may monitor for access of the first media by the first user. For example, control circuitry 304 may store the media identifier associated with media 520 selected by the first user, the series "Seinfeld," in a first data structure associated with the first user. The first data structure may be the same data structure as the data structure associated with the first user stored at media guidance data source 418. Control circuitry may access media guidance data source 418 via communications network 414.

For example, control circuitry 304 may store the selection of media 520 in an element of the first data structure that corresponds to a list of media the first user is interested in. Control circuitry 304 may receive indication that the first user is using media consumption application 502 to consume media with a second media identifier. For example, control circuitry 304 may receive an indication that the first user has logged in to an account associated with the first user and is accessing media. In response to receiving this indication, control circuitry 304 may query the first data structure to determine if the currently consumed media with the second media identifier is the same as the first media identifier, corresponding to "Seinfeld," stored in the first data structure.

In some embodiments, control circuitry 304 may detect, during the monitoring, that the first user is accessing media 520. For example, control circuitry 304 may detect, based on the monitoring by the control circuitry, that the first user has accessed and is currently consuming the series "Seinfeld."

In some embodiments, control circuitry 304 may compare, while the first user is accessing media 520, the consumption progress of the first user with respect to the first media with a consumption progress of the second user. For example, control circuitry 304 may query a first data structure associated with the first user for the first consumption progress of the first user with respect to the first media, the series "Seinfeld," and may retrieve a value corresponding to the first consumption progress of the first user which could be, for instance, 10 minutes into episode 5 of season 4. Control circuitry 304 may then query a second data structure associated with the second user for the second consumption progress of the sibling with respect to the first media, the series "Seinfeld," and may retrieve a value corresponding to the second consumption progress of the sibling which could be, for instance, 15 minutes into episode 5 of season 4.

Control circuitry 304 may query the data structure by executing a database query language script, such as SQL, utilizing the declarative "Select" command to access data in a particular table or expression. For example, control circuitry may query media guidance data source 418, which may contain a plurality of data structures associated with users and may, for instance, be organized into a three-dimensional matrix. The three-dimensional matrix may be organized where the third dimension represents each user and where the first and second dimensions may be rows and columns of data associated with each user, such as user handle (profile name) and media that the user has accessed. In this example, the first and second data structures would correspond to the rows and columns with information associated with each user, such that an entry in a row or column may correspond to consumption progress for a user with respect to media 520.

For example, if control circuitry wanted to receive the consumption progress of the first user with respect to media 520, a query may be sent to media guidance data source 418 containing the coordinates corresponding to ("Joe," row, col), where row and col represent the location of the media consumption progress for media 520. Control circuitry 304 may then compare the first consumption progress and the second consumption progress by subtracting the first consumption progress from the second consumption progress.

In some embodiments, control circuitry 304 may determine, based on the comparing, that the first user has caught up to the consumption progress of the second user. For example, control circuitry 304 may receive a comparison result of the first consumption progress of the first user with the second consumption progress of the second user for media 520. Control circuitry 304 may then determine whether the comparison result indicates the first user has caught up to the consumption progress of the second user. Control circuitry 304 may make the determination the first user has caught up based on comparison with an operant definition for what it means to be "caught up." In the most general sense, "caught up" means that the first user is near the media consumption progress of the second user. More specifically, "caught up" may mean that the media consumption progress of the first user is within a certain threshold of the media consumption progress of the second user. As another example, "caught up" may mean the media consumption progress of the first user is at a point identical to the media consumption progress of the second user.

In some embodiments, control circuitry 304 may determine that the first user has caught up to the consumption progress of the second user based on a threshold criterion, where the threshold criterion defines a range of relative consumption progress of the first user with respect to consumption progress of the second user that qualifies the first user's consumption progress as being caught up to the second user's consumption progress. The threshold criterion may be that the first user has caught up to the same exact point as the second user consuming media or may be that the first user has gotten close to catching up to the second user, where "close" could mean the first user is a few minutes away. Additionally, the threshold criterion could mean that the first user has reached the credits of an episode (based on proximity to the end of the episode) of a series and the second user's progress is at the beginning of the next episode; the same process could be true of the first user reaching the same season as the second user and so on. The threshold criterion may be stored in storage 308 or anywhere accessible to control circuitry 304 via communications network 414, such as media guidance data source 418.

For example, control circuitry 304 may determine the consumption progress in media 520 of the first user is 5 minutes away from the consumption progress in media 520 of the second user. If, for instance, the threshold criterion is that the first consumption progress of the first user and the second consumption progress of the second user are within 10 minutes of each other, then control circuitry 304 may determine the threshold condition is met.

As another example, control circuitry 304 may determine that the first user's consumption progress is at the credits of episode 4 of media 520 (based on the consumption progress being near the end of the total progress for an episode) and the second user's consumption progress is at the beginning of episode 5. In this case, control circuitry may determine that the proximity of the first user to the end of the episode likely means the first user is watching credits for the episode and may determine the threshold criterion is met. In response to the threshold condition being met, control circuitry 304 may send a signal to graphics processing circuitry to generate for display an alert that the first user has caught up to the second user.

In some embodiments, control circuitry 304 may receive a selection from the first user, through user input interface 310, of a given threshold criterion. For example, control circuitry 304 may generate for display a plurality of selectable threshold criterion options and may receive from the user, via user input interface 310, a third selection from the user of a given threshold criterion option of the plurality of selectable threshold criterion options that corresponds to the given threshold criterion, where control circuitry 304 uses the given threshold criterion when comparing the comparison result with the threshold criterion. Control circuitry 304 may generate for display options for the threshold criterion, for example: 5 minutes, 10 minutes, same episode, or same season. Control circuitry 304 may then receive, via user input interface 310, a selection by the user of a given threshold criterion, for instance 5 minutes. Control circuitry 304 will use the given threshold criterion, 5 minutes, which is selected by the first user, as the threshold criterion when control circuitry 304 determines if the first user has caught up to the second user.

In some embodiments, control circuitry 304 may synchronize information stored in data structures associated with specific users between media guidance data source 418 and storage 308. Control circuitry 304 may periodically update metadata in storage 308 from media guidance data source 418 via communications network 414. The periodic updating may be any number of discrete updates in a given timeframe, such as twice a day or twice an hour.

If an update time is missed due to lack of communications network 414 connectivity, control circuitry 304 may attempt to update and synchronize metadata associated with the user upon the return of access to communications network 414. For example, control circuitry 304 may lose connection with media guidance data source 418 upon receiving a user selection of an "Airplane Mode," where control circuitry 304 turns off communication functionality, such as Wi-Fi and Bluetooth. If a regular update time is missed while in "Airplane Mode," control circuitry 304 may attempt to update and synchronize metadata associated with the first user once control circuitry 304 receives an indication that "Airplane Mode" is off and access to communications network 414 is available.

Control circuitry 304 may update a data structure associated with the first user stored in storage 308 with metadata stored in a data structure associated with the first user at media guidance data source 418. For example, control circuitry 304 may determine the media consumption progress of the first user and the second user for media 520 based on querying media guidance data source 418, as described above. Control circuitry 304 may store these values in storage 308, such that even without access to media guidance data source 418, the first user can continue from their previous consumption progress consuming media 520 and control circuitry 304 can monitor for the first user catching up to the second user's consumption progress.

For instance, control circuitry 304 may update media consumption progress associated with the first user stored in storage 308 on the first user's mobile phone every morning at 9:00 am from media consumption progress stored in a database associated with the first user located at media guidance data source 418. When control circuitry 304 loses network connectivity because the first user has boarded an airplane at 10:00 am one day, control circuitry 304 may retrieve from storage 308 media consumption progress that is up to date based on the 9:00 am synchronization and the first user can resume consuming media from wherever he or she left off.

Control circuitry 304 may additionally periodically update metadata in media guidance data source 418 from storage 308 via communications network 414. Control circuitry 304 may update metadata stored in a data structure associated with the first user at media guidance data source 418 with metadata in a data structure associated with the first user stored in storage 308. For instance, control circuitry 304 may update the consumption progress of the first user in a data structure associated with the first user at media guidance data source 418 with the progress the first user has made consuming media 520 while disconnected from media guidance data source 418, perhaps while the first user is on an airplane.

For example, control circuitry 304 may monitor the media consumption progress of the first user with respect to media 520, as described above. Control circuitry 304 may store this value in storage 308, even without any access to media guidance data source 418. Control circuitry 304 may update the media consumption progress of the first user in media guidance data source 418 periodically, or when access to media guidance data source 418 is available. For instance, control circuitry 304 may lose access to media guidance data source 418 while the first user is on an airplane consuming media 520. Upon landing, control circuitry 304 may transmit the updated media consumption progress to media guidance data source 418 via communications network 414, updating the value for the consumption progress of the first user consuming media 520.

In some embodiments, in response to control circuitry 304 determining that the first user has caught up to the consumption progress of the second user, control circuitry 304 may generate for display an alert 506 indicating the first user has caught up to the second user. For example, in response to control circuitry 304 determining that the first user has caught up to the consumption progress of a second user in media 520, control circuitry 304 generates for display alert 506. Alert 506 is displayed on display 312 and conveys to the first user that they have caught up to the second user. For example, control circuitry 304 may generate for display an alert 506 that visually conveys that the first user has caught up to the second user. Additionally or in place of the visual alert 506, control circuitry 304 may generate an audio alert to convey that the first user has caught up to the second user.

In some embodiments, control circuitry 304 may execute a second application to determine the first user has caught up to the second user consuming media 520. The second application may be provided by a third party provider that is not the provider of media consumption application 502. Control circuitry 304 may determine that the first user has caught up based on comparing the media consumption progress of the two users, as described above. Control circuitry 304 may access the media consumption progress in storage 308 or at media guidance data source 418 via communications network 414.

In this instance, the determination by control circuitry 304 that the first user has caught up is not made by media consumption application 502 but by the second application, thus control circuitry 304 may not be able to render for display the alert 506 displayed in media consumption application 502 that the user has caught up. In this case, control circuitry 304 may transmit an alert that the first user has caught up to the second user to the first user's cellular telephone, computer, or other user equipment 500 that can receive communication. For example, control circuitry 304 may minimize media consumption application 502 and display the alert in a different window that was generated by control circuitry 304 executing the second application. As another example, control circuitry 304 may send a text message to the first user while the first user is consuming media 520 that the user has caught up to the second user's progress consuming media 520.

In some embodiments, upon control circuitry 304 determining that the consumption progress of the first user has caught up to the second user with respect to media 520, control circuitry 304 may pause playback of the currently consumed media 520 without input from the first user, while control circuitry 304 generates for display alert 506 that the first user has caught up to the second user. For example, in response to control circuitry 304 determining that the consumption progress of the first user has caught up to the consumption progress of the second user in media 520, control circuitry 304 may pause, without further input from the first user, playback of media 520 currently being consumed by the first user, where control circuitry 304 generates for display alert 506 while the playback of media 520 is paused.

In some embodiments, control circuitry 304 may generate for display alert 506 with an option to pause playback 508 of the currently consumed first media. For example, control circuitry 304 may generate for display an option for the first user to pause playback 508 of the currently consumed media 520. Upon receiving a selection of the option to pause playback 508 by the first user using user input interface 310, control circuitry 304 may pause playback of media 520 while the first user decides whether they want to continue consuming media 520.

In some embodiments, control circuitry 304 may generate for display alert 506 with an option to transmit a communication 516 to the second user. For example, control circuitry 304 may generate for display an option for the first user to transmit a communication 516 to the second user that the first user has caught up to the second user with respect to consumption of media 520. Upon receiving a selection of the option to transmit a communication 516 by the first user using user input interface 310, control circuitry 304 may send the communication the first user has caught up to the second user with respect to consuming media 520 via communications network 414. Control circuitry 304 may transmit the communication to the second user's computer, cellular telephone, television set, or other user equipment 500 that can receive the communication. For example, control circuitry 304 may transmit an alert to the second user's cellular telephone that the first user has caught up to his or her progress viewing "Seinfeld."

In some embodiments, upon selection of the option to transmit a communication 516, control circuitry 304 may additionally transmit other information relevant to the second user about the first user's consumption of media 520. Other information may comprise an indication that the first user plans to stop consuming media 520 and plans to wait to consume more of media 520 until a future time. Control circuitry 304 may generate for display a field allowing user input via user input interface 310, such as text, to customize the communication transmitted to the second user. Control circuitry 304 may receive the user input and transmit it as part of communication 516.

Control circuitry 304 may additionally present options to notify multiple users, who may be part of a group, the first user has caught up to one or more of said users' progress consuming media 520. Control circuitry 304 may present an option to notify users who have not consumed media 520 if they are part of the specified group. For example, control circuitry 304 may determine that a family including a mother, father, and two children, are part of the group, "Joe's Family" based on metadata stored in data structures associated with each user, as described above. Control circuitry 304 may receive an indication that the mother is consuming media 520 and has caught up to the father, as described above. Control circuitry 304 may generate an option to notify all other users in the group, "Joe's Family" that the mother has caught up to the father's progress consuming media 520. Alternatively or additionally, control circuitry 304 may generate an option to notify only other users in the group who have consumed media 520, as determined from metadata of the user profiles for the four family members, that the mother has caught up to the father consuming media 520. Alternatively or additionally, control circuitry 304 may generate an option to notify only the user, the father, whom the mother has caught up to consuming media 520.

In some embodiments, control circuitry 304 may generate for display alert 506 with an option to ignore 510 the alert 506. For example, control circuitry 304 may generate for display an option for the first user to ignore 510 alert 506 for currently consumed media 520. Upon receiving a selection by the first user using user input interface 310 of option to ignore 510, control circuitry 304 may cease generating for display alert 506 so that the first user can continue consuming media 520 without alert 506 being displayed.

In some embodiments, control circuitry 304 may generate for display alert 506 with social media information 512 for the second user. The social media information could be any information, such as status updates, photos, or posts, which could be obtained from a social media account associated with the second user (e.g. a Facebook account). For example, control circuitry 304 may retrieve from the second database associated with the second user social media account names, updates, or other information from the social media accounts of the second user. Control circuitry 304 may access the second data structure related to the second user at media guidance data source 418, as is described above. Control circuitry 304 may then query and retrieve social media information corresponding to the second user, by querying for information stored in the data structure, as described above. Upon retrieval of the social media information, control circuitry 304 may generate for display alert 506 with social media information for the second user 512.

In some embodiments, control circuitry 304 may generate for display alert 506 with a selectable icon 514 associated with a second media, where the first user has not caught up to the media consumption progress of an other user. The other user could be the second user whom the first user has caught up to consuming media 520, or a different third user. For example, control circuitry 304 may query a first data structure associated with the first user to identify a second media the first user has accessed. Control circuitry 304 may then query a second data structure associated with the second user to identify a third media the second user has accessed. Alternatively, control circuitry 304 may query a third data structure associated with the different third user to identify a third media the third user has accessed. For example, control circuitry 304 may query the data structure associated with an uncle, based on metadata associating the profile of the uncle with the first user, to identify a third media the uncle has accessed. The data structures associated with the first, second, or third users may be accessed via communications network 414 from media guidance data source 418 and are consistent with the data structures described above.

Control circuitry 304 may determine the second media to query based on metadata associated with the first media. For example, control circuitry 304 may determine from metadata stored in the first database that media 520 is closely related to a second media, "Curb Your Enthusiasm," because "Larry David" is listed as a writer and producer for both shows. Control circuitry 304 may query the second database for the media, "Curb Your Enthusiasm" before control circuitry 304 queries the second database for other media, because it is determined to be more relevant to what the first user is currently consuming based on metadata in the first database associated with both programs.

Control circuitry 304 may compare data of the second media and the third media, such as associated media identifiers, to determine whether they are the same media. In response to determining that the second media is the same as the third media, control circuitry 304 may determine if the first user has caught up to the consumption progress of the second user with respect to the second media.

Control circuitry 304 may generate for display on alert 506 a selectable indication 514 that the first user has not caught up to the second user with respect to the second media. For instance, control circuitry 304 may determine that the first user has caught up to a second user's progress consuming media 520, but control circuitry 304 may determine that the first user has not caught up to the progress of the second user consuming a second media, "House Of Cards." Control circuitry 304 may generate for display a selectable icon 514 that the first user has not yet caught up to the second user consuming "House of Cards" with an alert 506 indicating that the first user has caught up to the second user consuming "Seinfeld." Control circuitry 304 may detect selection of the selectable option, rendered and displayed on alert 506, by the first user to begin consuming the media, "House of Cards." In response to the selection, control circuitry 304 may generate for display content relating to "House of Cards" received from content source 416.

In some embodiments, control circuitry 304 may generate for display alert 506 with a selectable icon 516 associated with a second media that has not been accessed by the first user, but has been accessed by an other user. The other user could be the second user whom the first user has caught up to consuming media 520, or a different third user. For example, control circuitry 304 may query a second data structure associated with the second user to identify a second media the second user has accessed, in the same manner as is described above. Alternatively, control circuitry 304 may query a third data structure associated with the different third user to identify a second media the third user has accessed, as described above. Control circuitry 304 may determine the second media to query based on comparison of metadata associated with the first media and metadata associated with the second media. Control circuitry 304 may prioritize querying for second media similar to the first media, based on comparison of metadata associated with the first and second media, as described above.

Control circuitry 304 may then determine whether the first user has accessed the second media by querying a first data structure associated with the first user to determine if the first user has not accessed the second media. In response to determining that the first user has not accessed the second media, control circuitry 304 may retrieve media consumption progress for the second media from the second data structure, as was described above. Control circuitry 304 may determine whether a threshold criterion is met by the media consumption progress for the second media by the second user.

For instance, if control circuitry 304 determines a second user "Joe" has consumed two episodes of the first season of the second media, the program series "Breaking Bad," which contains multiple seasons, the first user may be able to catch up. If the threshold criterion is defined as less than half of a program series has been watched, control circuitry 304 may determine in this case that the second media does fulfill the threshold criterion. In response to determining that the threshold criterion is met by the media consumption progress for the second media by the second user, control circuitry 304 may generate for display with the alert 506 a selectable option 516 for the first user to access the second media, "Breaking Bad," where the selectable option 516 may be accompanied by an indicator of the media consumption progress by the second user of the second media.

In some embodiments, control circuitry 304 may generate for display alert 506 with an option 510 to continue consumption of media 520. Control circuitry 304 may generate for display an option 510 to continue consumption of media 520. Control circuitry 304 may receive a third selection from the first user of the option to continue consumption 510 of media 520. In response to receiving the third selection, control circuitry 304 may transmit a notification to the second user to indicate that the first user has caught up to the second user and is continuing consumption of media 520. Control circuitry 304 may send the alert that the first user has caught up to the second user with respect to consuming media 520 via communications network 414. For example, control circuitry 304 may transmit the notification to a second user's computer, cellular telephone, television set, or other user equipment 500 that can receive the notification.

In some embodiments, control circuitry 304 may generate for display selectable options for one or more users associated with a first user when control circuitry 304 determines that the first user is accessing media consumption application 502. For example, control circuitry 304 may determine that a first user, a wife, is accessing media consumption application 502 as described above. Control circuitry 304 may generate for display a plurality of selectable options corresponding to individual users. Control circuitry 304 may determine which selectable options to generate for display based on accessing a data structure associated with the wife. For instance, control circuitry 304 may detect that the first user, a wife in a family, is accessing media consumption application 502, as described above. Control circuitry 304 may then query a data structure in a database, as described above, to determine if the first user, the wife, has set any additional users for her account. Control circuitry 304 may then generate for display selectable user options based on information corresponding to the users retrieved from the wife's account. For example, control circuitry 304 may determine based on querying the data structure associated with the wife that the wife's account is associated with a husband and a child. In this instance, control circuitry may generate for display selectable options corresponding to the husband and the child.

In some embodiments, control circuitry 304 may determine which options to generate based on receiving communication from nearby user devices. Control circuitry 304 may receive an indication through Bluetooth pairing, Bonjour protocol, or other means for relaying from a device information that a user is nearby and could be consuming media 520. Control circuitry 304 may compare a signature received from a nearby user device with signatures stored in a data structure containing a plurality of users at media guidance data source 418 to determine a user the device corresponds to. In response to determining the user the device corresponds to, control circuitry 304 may generate for display a selectable option associated with the user. For instance, control circuitry 304 may determine that the husband is consuming media 520 with his wife based on receiving a Bluetooth pairing signature from his mobile telephone. Control circuitry 304 may then generate for display a selectable option corresponding to the husband.

In some embodiments, control circuitry 304 may receive an indication from a user of a selection of one or more particular users consuming media 520 together. For example, control circuitry 304 may receive an indication, via user input interface 310, that the wife is consuming media with both the husband and the child.

In some embodiments, control circuitry 304 may retrieve the media consumption progress for media 520 of the selected one or more users from data structures associated with the selected one or more users. In response to receiving the selection of the husband and the child, control circuitry 304 may access data structures corresponding to the husband and the child and retrieve values corresponding to their consumption progress for a given media 520, as described above.

In some embodiments, control circuitry 304 may update the media consumption progress for media 520 with respect to the users selected. For example, once the husband has been selected as consuming media 520, control circuitry 304 may update the media consumption progress for the husband with respect to media 520 in addition to the media consumption progress of the wife with respect to media 520.

In some embodiments, control circuitry 304 may cease updating the media consumption progress of a user if control circuitry 304 detects he or she has stopped consuming media 520 and may store the value in the data structure associated with the user. For example, control circuitry 304 may detect that the husband has ceased consuming media 520 based on no longer receiving a Bluetooth pairing signature from his mobile telephone. Control circuitry 304 may cease updating the media consumption progress of media 520 for the husband and may store the value associated with the media consumption progress in a data structure associated with the husband. As another example, control circuitry 304 may generate for display a selectable option for each user currently consuming media 520. Upon selection of the selectable option corresponding to the husband, control circuitry 304 determines that the husband is no longer consuming media 520.

In some embodiments, control circuitry 304 may detect, at a later time, access of media 520 by one of the selected users. Control circuitry 304 may begin playback of media 520 based on the media consumption progress for media 520 stored in a data structure associated with the user, which was updated while the user was consuming media 520 with the first user. For example, control circuitry 304 may detect that the husband is accessing media at a time later than when he accessed media with his wife. Control circuitry 304 may begin playback of media 520 based on the media consumption progress stored in the data structure associated with the husband, which was updated while he was consuming media 520 with his wife, even though he was not the primary consumer, (i.e., logged in to his account) while consuming media 520.

Figure 6:
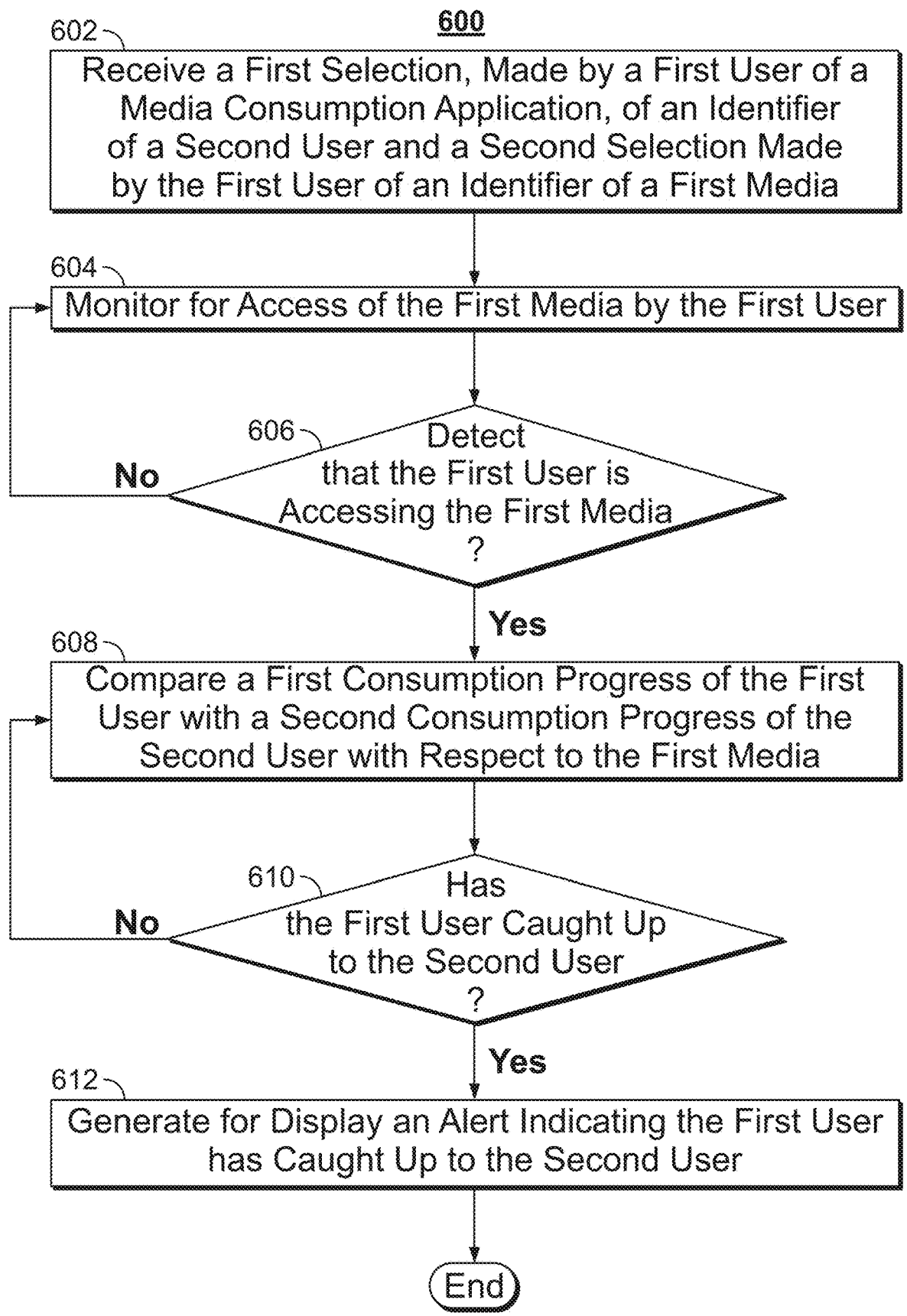
FIG. 6 is a flowchart of illustrative steps involved in determining whether a first user has caught up to the media consumption progress of a second user, in accordance with some embodiments of the disclosure.

FIG. 6 is a flowchart of illustrative steps involved in determining if a first user has caught up to the media consumption progress of a second user, in accordance with some embodiments of the disclosure. For example, process 600 may be executed by control circuitry 304 (FIG. 3) to determine if a first user consuming media has caught up to the progress of a second user.

Process 600 begins at 602, where control circuitry 304 may receive a first selection, made by a first user of media consumption application 502 executed by control circuitry 304, of an identifier of a second user and a second selection made by the first user of an identifier of a first media. The identifier of a second user may consist of a string of characters that could be matched to metadata in a stored user profile in a data structure corresponding to the second user. The string of characters could refer to a name, birthdate, profile name, or any other identifying characteristic of the second user. The identifier of a first media may consist of a string of characters that could be matched to metadata in a stored user profile in a data structure corresponding to the second user. The string of characters could refer to a title, actor, studio name, or any other identifying characteristic of media. Control circuitry may access via communications network 414 the data structure which may contain metadata associated with media the user has consumed, progress the user has made consuming media, and information about the user. Control circuitry 304 may query, access, and retrieve data from a data structure as described in FIG. 5. For example, control circuitry 304 may receive a selection made by the first user of an identifier of a second user, "Joe," and an identifier of a first media, "Seinfeld." Control circuitry 304 may determine, through querying media guidance data source 418, which contains data structures corresponding to a plurality of users, the identifier "Joe" corresponds to second user Joe, a sibling of the first user. In the same way, control circuitry 304 may determine that the identifier of a first media received, "Seinfeld," corresponds to the media "Seinfeld" (i.e., media 520).

Process 600 may continue to 604, where control circuitry 304 may monitor for access of the first media by the first user. For example, in response to receiving first user selections, the control circuitry may store the unique media identifier associated with the series "Seinfeld" in a first data structure. Control circuitry 304 may receive indication that the first user is using media consumption application 502 to consume media with a second media identifier. In response to receiving this indication, control circuitry 304 may query the first data structure to determine if the media with the second media identifier currently consumed is the same as the first media identifier, corresponding to media 520 stored in the data structure.

Process 600 may continue to 606, where control circuitry 304 may detect that the first user is accessing the first media. For example, control circuitry 304 may detect, based on monitoring by control circuitry 304 that the first user has accessed and is consuming the series "Seinfeld." If first user access of the first media is not detected, control circuitry 304 may continue to monitor for access of the first media by the first user.

Process 600 may continue to 608, where control circuitry 304 may compare a first consumption progress of the first user with respect to media 520 with a second consumption progress of the second user with respect to media 520. For example, control circuitry 304 may query a first data structure for the first consumption progress of the first user with respect to the first media and retrieve a value corresponding to the first consumption progress of the first user which could be, for instance, 10 minutes into episode 5 of season 4. Control circuitry 304 may then query a second data structure for the second consumption progress of the second user with respect to the first media and retrieve a value corresponding to the second consumption progress of the second user which could be, for instance, 15 minutes into episode 5 of season 4. Control circuitry 304 may access and query the first data structure and the second data structure via communications network 414 on a media guidance data source 418, as described above in FIG. 5. Control circuitry 304 may then compare the first consumption progress and the second consumption progress. For example, control circuitry 304 may compare the first consumption progress of the first user with respect to media 520 which could be, for instance, 10 minutes into episode 5 of season 4 with the second consumption progress of the sibling with respect to the media 520 and which could be, for instance, 15 minutes into episode 5 of season 4, by subtracting the first consumption progress from the second consumption progress.

Process 600 may continue to 610, where control circuitry 304 may determine if the first user has caught up to the media consumption progress of the second user with respect to the first media. For example, control circuitry 304 may receive a comparison result of the first consumption progress of the first user with the second consumption progress of the second user. Control circuitry 304 may then determine whether the comparison result indicates the first user has caught up to the consumption progress of the second user.

If control circuitry 304 determines that the first user has not caught up to the consumption progress of the second user, then process 600 may return to 608, where control circuitry 304 may again compare the consumption progress of the first and second user. The control circuitry 304 makes the determination the first user has caught up based on comparison with an operant definition for what it means to be "caught up." In the most general sense, "caught up" means that the first user is near the media consumption progress of the second user. More specifically, "caught up" may mean that the media consumption progress of the first user is within a certain threshold of the media consumption progress of the second user, such as being within 5 minutes of the second user. As another example, "caught up" may mean the media consumption progress of the first user is at a point identical to the media consumption progress of the second user.

Process 600 may continue to 612, where control circuitry 304 may generate for display alert 506 indicating that the first user has caught up to the consumption progress of the second user. For example, in response to control circuitry 304 determining that the first user has caught up to the consumption progress of a second user in consuming media 502, alert 506 may be generated for display by control circuitry 304. Control circuitry 304 generates for display alert 506, which is displayed on display 312 and conveys to the first user visually that they have caught up to the second user, for instance with text stating, "You have caught up to Joe viewing "Seinfeld.""

Figure 7:
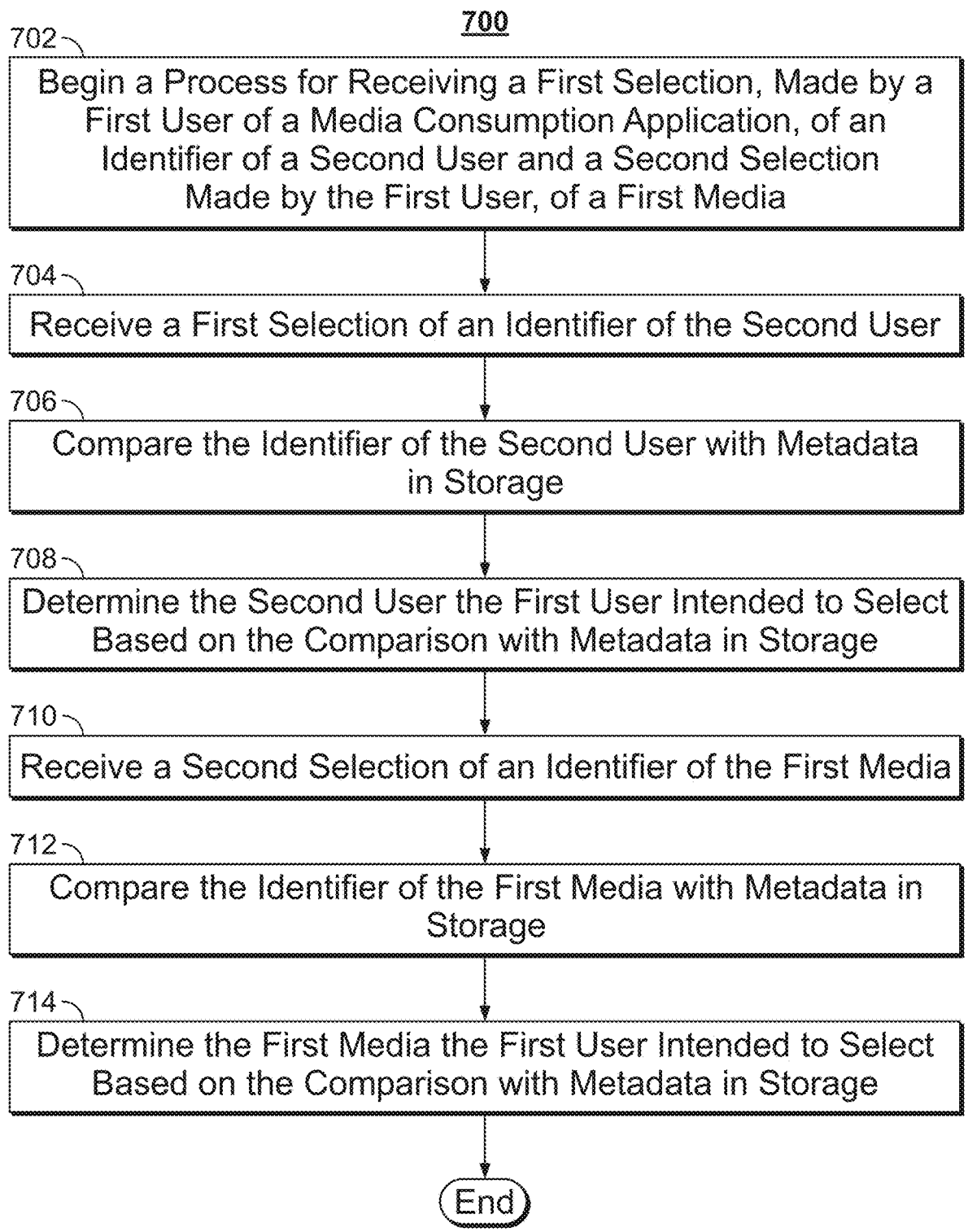
FIG. 7 is a flowchart of illustrative steps involved in receiving a first selection, made by a first user of a media consumption application, of an identifier of a second user, as well as receiving a second selection made by the first user, of a first media, in accordance with some embodiments of the disclosure.

FIG. 7 is a flowchart of illustrative steps involved in a process for receiving a first selection, made by a first user of a media consumption application, of an identifier of a second user, as well as receiving a second selection made by the first user, of a first media, in accordance with some embodiments of the disclosure. For example, process 700 may be executed by control circuitry 304 (FIG. 3) to receive the first selection and the second selection.

Process 700 begins at 702, where control circuitry 304 may begin a process for receiving a first selection, made by a first user of a media consumption application, of an identifier of a second user and a second selection made by the first user, of a first media. Control circuitry 304 may execute 702 when 602 of process 600 begins. For example, control circuitry 304 may receive a selection of an identifier of a second user, "Joe," and a selection of an identifier of a first media, "Seinfeld."

Process 700 may continue to 704, where control circuitry 304 may receive a first selection of an identifier of the second user. Control circuitry 304 may receive a selection of an identifier of the second user, as described in FIG. 5-6. For example, control circuitry 304 may receive a string of characters, "Joe," as an identifier of a second user from the first user selection.

Process 700 may continue to 706, where control circuitry 304 may compare the identifier of the second user with metadata in storage. For instance, control circuitry 304 may access a plurality of data structures associated with users from a media guidance data source 418. The plurality of data structures associated with users may be stored in memory in data structures at media guidance data source 418. Control circuitry 304 may search the plurality of data structures at media guidance data source 418 based on the received first identifier, "Joe," of the second user to compare the identifier with metadata associated with the plurality of users.

Process 700 may continue to 708, where control circuitry 304 may determine the second user the first user intended to select based on the comparison with metadata in storage. Control circuitry 304 may determine a match between the received identifier, "Joe," and a given profile stored at media guidance data source 418. In this case, control circuitry 304 determines the given profile corresponds to the second user, "Joe," that the first user selected.

Process 700 may continue to 710, where control circuitry 304 may receive a second selection of a first media identifier of the first media. Control circuitry 304 may receive a selection of an identifier of the first media, as described in FIG. 5-6. For example, control circuitry 304 may receive a string of characters, "Seinfeld," as an identifier of a first media from the second user selection.

Process 700 may continue to 712, where control circuitry 304 may compare the identifier of the first media with metadata in storage. For instance, control circuitry 304 may access a plurality of media from a media guidance data source 418. The plurality of media may be stored in memory in a data structure at media guidance data source 418. Control circuitry 304 may search the plurality of media at media guidance data source 418 based on the received second identifier, "Seinfeld," of the first media to compare the identifier with metadata associated with the plurality of media in storage.

Process 700 may continue to 714, where control circuitry 304 may determine the first media the first user intended to select based on the comparison with metadata in storage. Control circuitry 304 may determine a match between the received identifier, "Seinfeld," and a given media stored at media guidance data source 418. In this case, control circuitry 304 determines the given media corresponds to the first media, "Seinfeld," that the first user selected. The receipt of the first and the second selection by control circuitry 304 may conclude processing of 602 of process 600.

Figure 8:
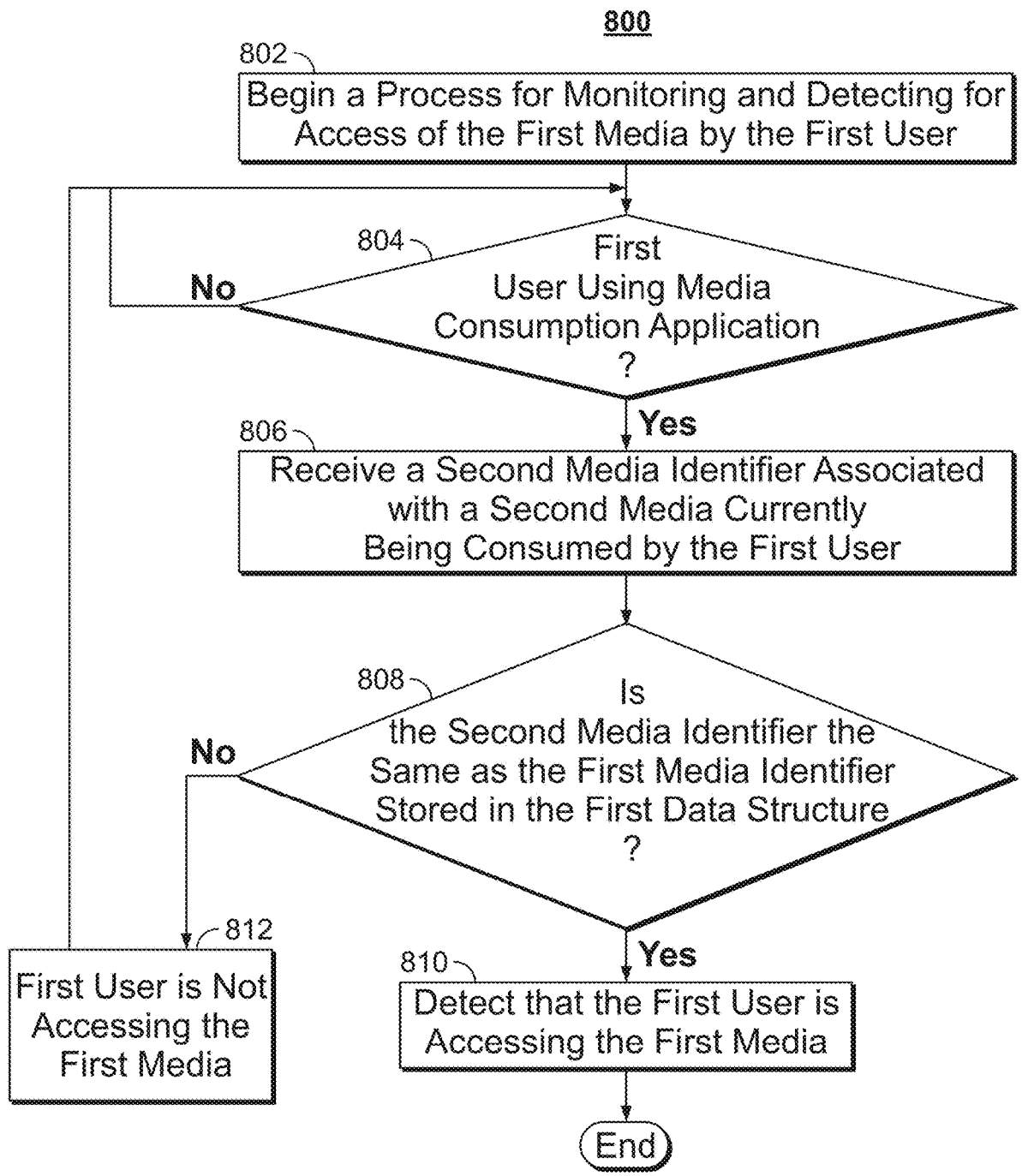
FIG. 8 is a flowchart of illustrative steps involved in monitoring and detecting for access of the first media by the first user, in accordance with some embodiments of the disclosure.

FIG. 8 is a flowchart of illustrative steps involved in a process for monitoring and detecting for access of the first media by the first user, in accordance with some embodiments of the disclosure. For example, process 800 may be executed by control circuitry 304 (FIG. 3) to receive the first selection and the second selection.

Process 800 begins with 802, where control circuitry 304 may begin a process for monitoring and detecting for access of the first media by the first user. For example, control circuitry 304 may begin a process for monitoring and detecting for access of "Seinfeld" (i.e., media 520) by the first user. Control circuitry 304 may execute 802 when 604 of process 600 begins.

Process 800 may continue to 804, where control circuitry 304 determines whether the first user is using media consumption application 502. For instance, control circuitry 304 may receive a command to execute and render for display media consumption application 502. In this case, control circuitry 304 may determine that the first user is using the media consumption application. If control circuitry 304 determines the first user is not using the media consumption application, control circuitry 304 may continue to monitor for access of the media consumption application by the first user.

If control circuitry 304 determines the first user is using media consumption application 502, process 800 may continue to 806, where control circuitry may receive a second media identifier associated with a second media currently being consumed by the first user. Similar to receiving the identifiers associated with the first and second selections described above, control circuitry 304 may receive a second media identifier associated with a second media. The second media identifier may take the same general form as the first media identifier described above. For instance, the identifier of the second media received by control circuitry 304 could be a series of characters corresponding to the title of the second media, such as "Seinfeld."

Process 800 may continue to 808, where control circuitry 304 determines whether the second media identifier is the same as the first media identifier stored in the first data structure, as described above in FIG. 5-6. Briefly, the first media identifier may be stored in the first data structure, associated with the first user, located at media guidance data source 418. Control circuitry 304 may access and compare the first media identifier with the second media identifier. Control circuitry 304 may then determine whether the media identifiers are the same. For instance, control circuitry 304 may determine that the characters corresponding to the first media identifier are the same as the characters corresponding to the second media identifier and as such the first user is consuming media 520. This determination by control circuitry 304 may conclude processing of 604 of process 600 and begin processing of 606.

If control circuitry 304 determines that the first media identifier is not the same as the second media identifier, control circuitry 304 determines the first user is not accessing the first media 812. In this case, control circuitry 304 may return to step 804 to detect if the user is still using the media consumption application at some later time and determine if they are now consuming the first media. For instance, control circuitry 304 may detect that the first user may initially be consuming media that is not media 520, but switches to consuming media 520 after some period of time. In this way, monitoring by control circuitry 304 for access to the media 520 may be periodic in that it checks the media the first user is consuming multiple times during one instance of the first user using the media consumption application.

If control circuitry 304 determines that the first media identifier is the same as the second media identifier, control circuitry 304 detects that the first user is accessing the first media. This determination by control circuitry 304 may conclude processing of 606 of process 600.

Figure 9:
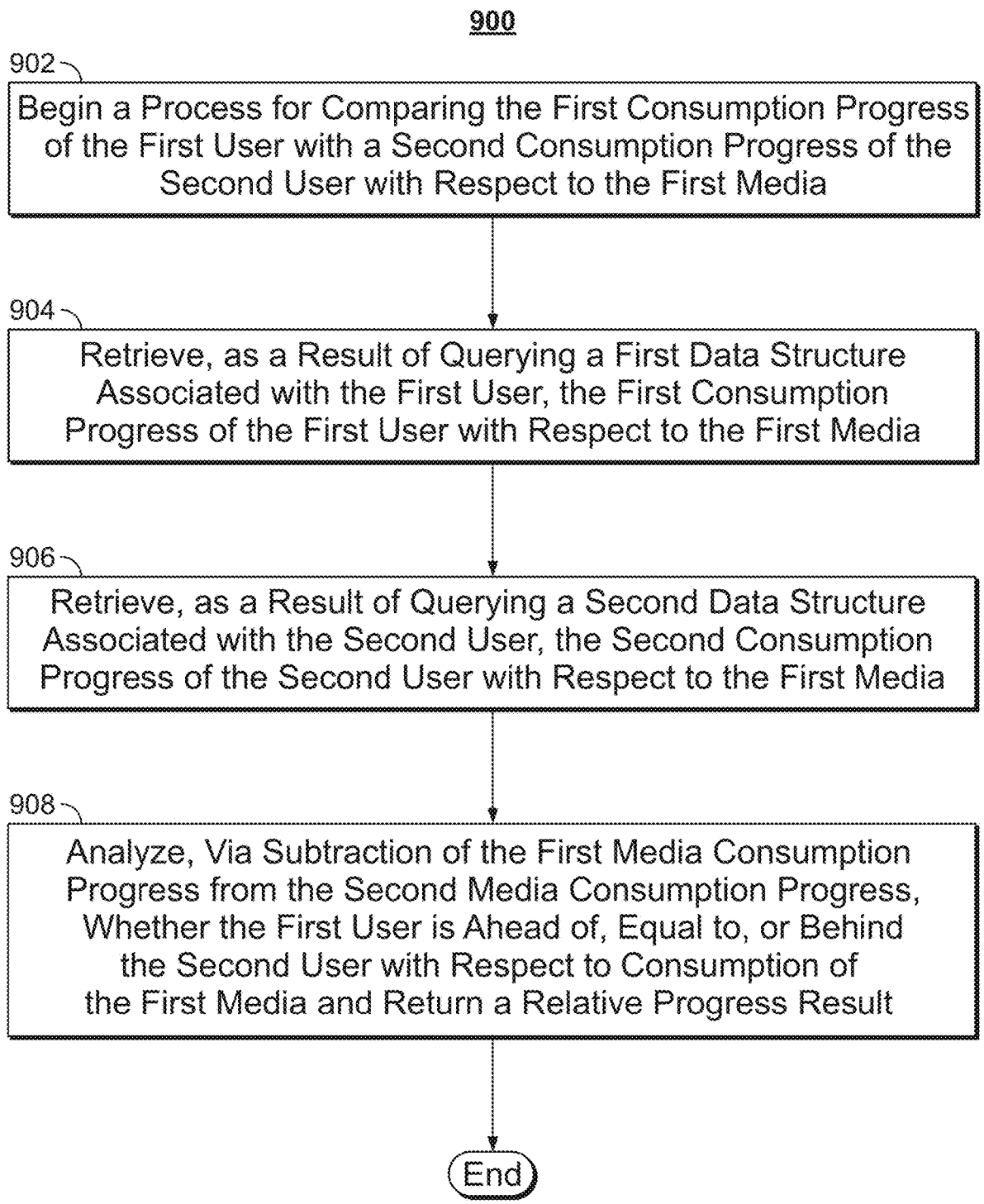
FIG. 9 is a flowchart of illustrative steps involved in comparing the first consumption progress of the first user with respect to the first media with a second consumption progress of the second user, in accordance with some embodiments of the disclosure.

FIG. 9 is a flowchart of illustrative steps of a process for comparing the first consumption progress of the first user with respect to the first media with a second consumption progress of the second user, in accordance with some embodiments of the disclosure. For example, process 900 may be executed by control circuitry 304 (FIG. 3) to receive the first selection and the second selection.

Process 900 begins with 902, where control circuitry 304 may begin a process for comparing the first consumption progress of the first user with respect to the first media with a second consumption progress of the second user with respect to the first media. For example, control circuitry 304 may compare the progress of the first user consuming media 520 with the progress of the first user's sibling "Joe" consuming media 520. Control circuitry 304 may execute 902 when 608 of process 600 begins.

Process 900 may continue to 904, where control circuitry 304 may retrieve, as a result of querying a first data structure associated with the first user, the first consumption progress of the first user with respect to the first media. Control circuitry 304 accessing, querying, and retrieving data from a data structure is described further in FIG. 5-6. For example, control circuitry 304 may query a first data structure for the first consumption progress of the first user with respect to media 520 and retrieve a value corresponding to the first consumption progress of the first user which could be, for instance, 10 minutes into episode 5 of season 4. The first data structure may be located at media guidance data source 418 and accessed by control circuitry 304 through a communications network 414.

Process 900 may continue to 906, where control circuitry 304 may retrieve, as a result of querying a second data structure associated with the second user, the second consumption progress of the second user with respect to the first media. Control circuitry accessing, querying, and retrieving data from a data structure is described further in FIG. 5-6. For example, control circuitry 304 may query a second data structure for the second consumption progress of the sibling "Joe" with respect to the media 520 and retrieve a value corresponding to the second consumption progress of the sibling which could be, for instance, 15 minutes into episode 5 of season 4. The second data structure may be located at a media guidance data source 418 and accessed by control circuitry 304 through a communications network 414.

Process 900 may continue to 908, where control circuitry 304 may analyze via subtraction of the first media consumption progress from the second media consumption progress, whether the first user is ahead of, equal to, or behind the second user with respect to consumption of the first media and return a relative progress result. Control circuitry 304 may calculate the relative progress result based on subtraction of one media consumption progress from another. For instance, control circuitry 304 may determine the first media consumption progress corresponds to 10 minutes into episode 5 of season 4 and the second media consumption progress corresponds to 15 minutes into episode 5 of season 4.

Control circuitry 304 may receive media consumption progress in any format that allows control circuitry 304 to subtract them. For instance, control circuitry may receive the above examples formatted into data objects with variables corresponding to "season," "episode," and "minutes." Each of these variables may have an associated numerical value. Control circuitry 304 may then subtract the numerical value stored in the "season" variable for the first media consumption progress from the numerical value stored in the "season" variable for the second media consumption progress, and so on. In this way, control circuitry 304 may generate the relative progress result that the first media consumption progress is 5 minutes behind the second media consumption progress, indicating the first user is 5 minutes away from reaching the exact same progress as the second user. Control circuitry 304 may then return the relative progress result for use by 610 of process 600 in determining whether the first user has caught up to the second user. This determination by control circuitry 304 of the relative progress result may conclude processing of 608 of process 600.

Figure 10:
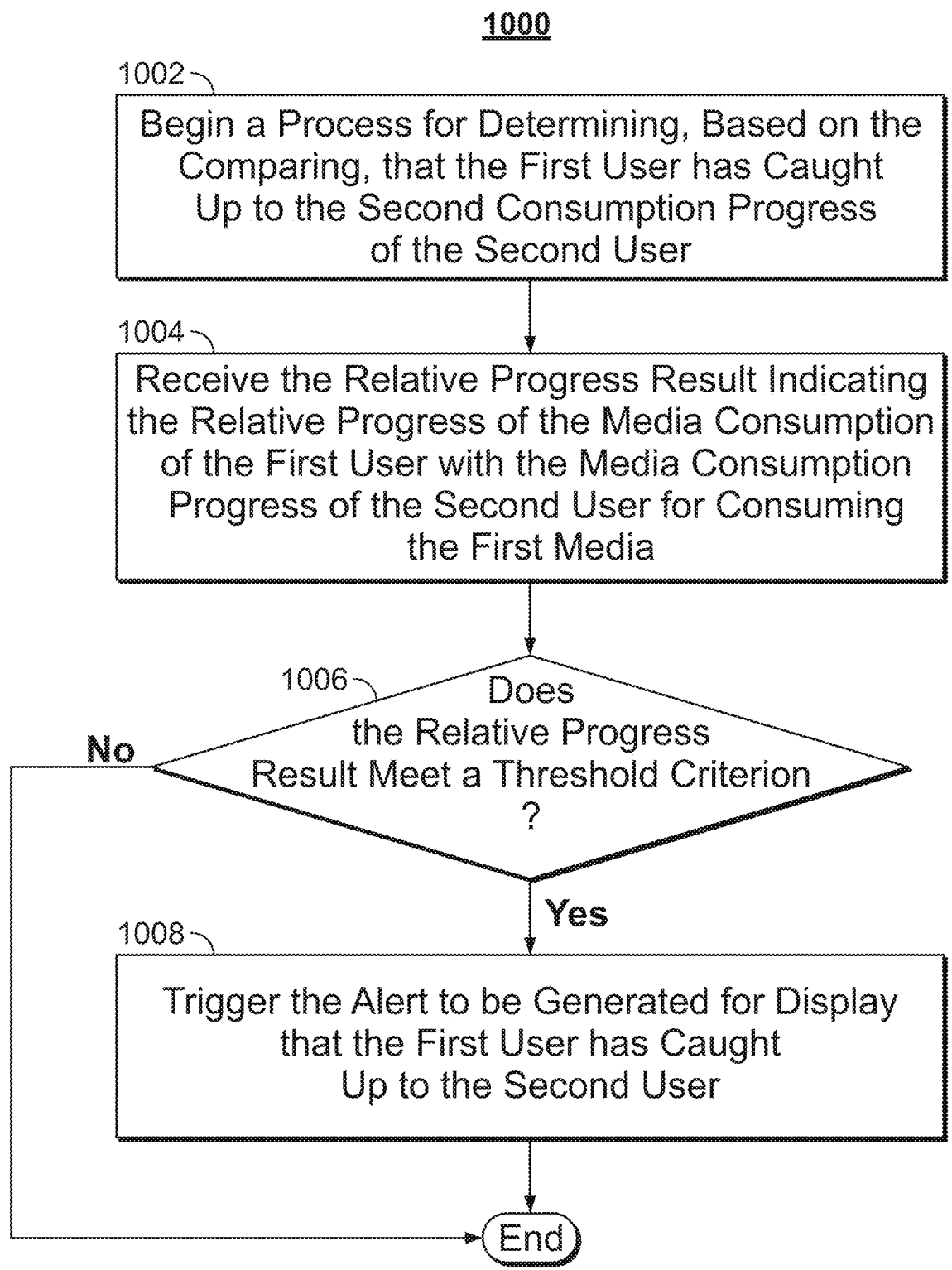
FIG. 10 is a flowchart of illustrative steps involved in determining, based on the comparing, that the first user has caught up to the second consumption progress of the second user, in accordance with some embodiments of the disclosure.

FIG. 10 is a flowchart of illustrative steps of a process for determining, based on the comparing, that the first user has caught up to the second consumption progress of the second user, in accordance with some embodiments of the disclosure. For example, process 1000 may be executed by control circuitry 304 (FIG. 3) to receive the first selection and the second selection.

Process 1000 begins with 1002, where control circuitry 304 may begin a process for determining, based on the comparing, that the first user has caught up to the second consumption progress of the second user. For example, control circuitry 304 may determine that the first user has caught up to the second user, the sibling "Joe" consuming media 520. Control circuitry 304 may execute 1002 when 610 of process 600 begins.

Process 1000 may continue to 1004, where control circuitry 304 may receive the relative progress result indicating the relative progress of the media consumption of the first user with the media consumption progress of the second user for consuming the first media. Control circuitry 304 may receive the relative progress result generated in 608 of process 600. The relative progress result contains information relating the consumption progress of the first user and the second user for a given first media, as described in process 900. For example, control circuitry 304 may receive the relative progress result indicating that the first user is five minutes behind the second user consuming media 520.

Process 1000 may continue to 1006, where control circuitry 304 may determine whether the relative progress result meets a threshold criterion. Control circuitry 304 may compare the relative progress result with the threshold criterion. The threshold criterion could be based on any value or range of values. For example, the threshold criterion could be: 5 minutes, 10 minutes, same episode, or same season. For illustrative purposes, say the threshold criterion is 10 minutes. Control circuitry 304 may use the given threshold criterion, 5 minutes, as the threshold criterion when control circuitry 304 determines if the first user has caught up to the second user. Control circuitry 304 determines if the first user has caught up to the second user by comparing the relative progress result to the threshold criterion. For example, if the relative progress result indicates that the first user is 5 minutes behind the sibling Joe's consumption progress for media 520, then control circuitry 304 may determine that the relative progress result does meet the threshold criterion.

If the relative progress result does not meet the threshold criterion, control circuitry 304 may end 610 of process 600 and return to 608 of process 600. For example, if it is determined that the first user has not yet caught up to his or her sibling, but he or she is continuing to view media 520, control circuitry 304 may continue to compare the consumption progress of the first user and the sibling. In this way, control circuitry 304 may check at future time points if the first user has caught up (based on fulfilling the threshold criterion) after consuming more of the first media.

If control circuitry 304 determines the relative progress result does meet the threshold criterion, process 1000 may continue to 1008, where control circuitry 304 may trigger the alert to be generated for display that the first user has caught up to the second user. For example, control circuitry 304 may send an indication to prepare for display and display the alert that the first user has caught up to the sibling with respect to consuming media 520. This indication sent by control circuitry 304 may conclude processing of 610 of process 600.

FIG. 11 is a flowchart of illustrative steps of a process for generating for display an alert indicating the first user has caught up to the second user, in accordance with some embodiments of the disclosure. For example, process 1100 may be executed by control circuitry 304 (FIG. 3) to generate for display the alert 506 indicating the first user has caught up to the second user consuming media 520.

Process 1100 begins with 1102, where control circuitry 304 may begin a process for generating for display an alert indicating the first user has caught up to the second user. For example, control circuitry 304 may generate for display an alert indicating the first user has caught up to the sibling with respect to consuming media 520. Control circuitry 304 may execute 1102 when 612 of process 600 begins.

Process 1100 may continue to 1104, where control circuitry 304 may receive an indication that the first user has caught up to the second user. Control circuitry 304 may determine that the first user has caught up to the second user as described in process 1000. In response to this determination, control circuitry 304 may send an indication to render graphics for an alert indicating that the first user has caught up to the second user.

Process 1100 may continue to 1106, where control circuitry 304 may render graphics for the alert that the first user has caught up to the second user. Control circuitry 304 receives the indication that the first user has caught up and renders the graphics corresponding to the alert for display.

Process 1100 may continue to 1108, where control circuitry 304 may output on display 312 the alert that the first user has caught up to the second user. For example, control circuitry 304 may transmit the rendered alert for viewing by the first user on display 312. This transmission of the alert for display sent by graphics circuitry may conclude processing of 612 of process 600.

It should be noted that processes 600-1100 or any step thereof could be performed on, or provided by, any of the devices shown in FIGS. 3-5. For example, any of processes 600-1100 may be executed by control circuitry 304 (FIG. 3) as instructed by control circuitry implemented on user equipment 402, 404, and/or 406 (FIG. 4) in order to generate for display an alert that the first user has caught up to the second user consuming with respect to consuming media. In addition, one or more steps of processes 600-1100 may be incorporated into or combined with one or more steps of any other process or embodiment.

It is contemplated that the steps or descriptions of each of FIGS. 6-11 may be used with any other embodiment of this disclosure. In addition, the steps and descriptions described in relation to FIGS. 6-11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIGS. 6-11.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, monitoring for when a user accesses particular media may be performed by processing circuitry (e.g., by processing circuitry 306 of FIG. 3). The processing circuitry, for instance, may be a general purpose processor, a customized integrated circuit (e.g., an ASIC), or a field-programmable gate array (FPGA) within user equipment 300, media content source 416, or media guidance data source 418. For example, a data structure corresponding to a user profile, as described herein, may be stored in, and retrieved from, storage 308 of FIG. 3, or media guidance data source 418 of FIG. 4. Furthermore, processing circuitry, or a computer program, may update settings associated with a user, such as a register of media a particular user has recently consumed, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating, by a server, a user interface for display on a first electronic media consumption device associated with a first user;
   receiving, by the server, a selection made on the user interface, wherein the selection identifies a second user and a first media;
   in response to the received selection, and prior to the first user accessing the first media of a plurality of media using the first electronic media consumption device, receiving, by a control circuitry of the server, a request to generate a notification when progress of the first user in the first media reaches progress of the second user in the first media, wherein the request identifies: the second user, and the first media; and in response to receiving the request to generate the notification, generating for display on the first electronic media consumption device an alert when the first user's progress of consumption of the first media has caught up to the second users progress of consumption of the first media.

2. The method of claim 1, wherein, the selection on the user interface is made by the first user associated with the user interface.

3. The method of claim 1, wherein, determining that progress of the first user in the first media reached progress of the second user in the first media comprises:

querying the first electronic media consumption device to obtain the first user's progress of consumption of the first media;

querying a second electronic media consumption device that is associated with the second user to obtain the second users progress of consumption of the first media; and comparing the first user's progress with the second users progress to determine whether the progress of the first user in the first media reached progress of the second user in the first media.

4. The method of claim 1, further comprising, monitoring, by the control circuitry, the progress of the consumption of the first media by the first and the second user.

5. The method of claim 4, wherein the monitoring is performed on a periodic basis.

6. The method of claim 4, wherein the monitoring is performed when access to the first electronic media consumption device is provided.

7. The method of claim 1, further comprising transmitting an indication that the first user plans to stop consuming the first media until a specific time.

8. The method of claim 1, wherein the alert includes social media information status and social media information associated with the second user.

9. The method of claim 1, wherein determining that the first user's progress has caught up to the second users progress comprises:

determining if the first user's progress is within a threshold time frame of the second user's progress; and in response to determining that the first users progress is within the threshold time frame of the second users progress, associating the first user's progress as caught up with the second users progress.

10. The method of claim 9, further comprising, determining a relative consumption progress of the first user with respect to consumption progress of the second user based on the threshold time frame.

11. A system comprising:

communications circuitry to access a first electronic media consumption device associated with a first user; and control circuitry configured to:

generate a user interface for display on a first electronic media consumption device associated with a first user;

receive a selection made on the user interface, wherein the selection identifies a second user and a first media;

in response to the received selection, and prior to the first user accessing the first media of a plurality of media using the first electronic media consumption device, receive a request to generate a notification when progress of the first user in the first media reaches progress of the second user in the first media, wherein the request identifies: the second user, and the first media; and in response to receiving the request to generate the notification, generate for display on the first electronic media consumption device an alert when the first user's progress of consumption of the first media has caught up to the second users progress of consumption of the first media.

12. The system of claim 11, wherein, the selection on the user interface is made by the first user associated with the user interface.

13. The system of claim 11, wherein, determining that progress of the first user in the first media reached progress of the second user in the first media comprises, the control circuitry configured to:

query the first electronic media consumption device to obtain the first user's progress of consumption of the first media;

query a second electronic media consumption device that is associated with the second user to obtain the second user's progress of consumption of the first media; and compare the first user's progress with the second user's progress to determine whether the progress of the first user in the first media reached progress of the second user in the first media.

14. The system of claim 11, further comprising, the control circuitry configured to monitor the progress of the consumption of the first media by the first and the second user.

15. The system of claim 14, wherein the monitoring by the control circuitry is performed on a periodic basis.

16. The system of claim 14, wherein the monitoring by the control circuitry is performed when access to the first electronic media consumption device is provided.

17. The system of claim 11, further comprising, the control circuitry configured to transmit an indication that the first user plans to stop consuming the first media until a specific time.

18. The system of claim 11, wherein the alert includes social media information status and social media information associated with the second user.

19. The system of claim 11, wherein determining that the first user's progress has caught up to the second users progress comprises, the control circuitry configured to:

determine if the first user's progress is within a threshold time frame of the second user's progress; and in response to determining that the first users progress is within the threshold time frame of the second users progress, associate the first user's progress as caught up with the second users progress.

20. The system of claim 19, further comprising, the control circuitry configured to determine a relative consumption progress of the first user with respect to consumption progress of the second user based on the threshold time frame.

* * * * *